United States Patent [19]

Bratten

[11] 4,390,428
[45] Jun. 28, 1983

[54] FILTRATION APPARATUS

[76] Inventor: Jack R. Bratten, 5970 St. James Dr., West Bloomfield, Mich. 48033

[21] Appl. No.: 318,713

[22] Filed: Nov. 6, 1981

[51] Int. Cl.³ ............................................. B01D 29/02
[52] U.S. Cl. ...................................... 210/400; 210/541
[58] Field of Search ................ 210/400, 401, 386, 541

[56] References Cited

U.S. PATENT DOCUMENTS

| | | | |
|---|---|---|---|
| 3,335,862 | 8/1967 | Hirs | 201/400 X |
| 3,706,378 | 12/1972 | Markwick | 210/400 X |
| 3,899,426 | 8/1975 | Hirs | 210/387 |

Primary Examiner—John Adee
Attorney, Agent, or Firm—Cullen, Sloman, Cantor, Grauer, Scott & Rutherford

[57] ABSTRACT

Contaminated liquid is filtered through a conveyor-driven endless loop filter belt which surrounds a filter box submerged in a tank of the liquid to be filtered. The liquid is caused to flow through the filter belt and into the perforated upper and lower walls of the box by means of pump-induced static pressure differential. After predetermined build-up of filter cake on the filter web over the filter box inlets, control means index the filter web to bring clean web into registry with the filter box inlets. Improved means for preventing contaminated liquid from by-passing the longitudinal edges of the filter belt comprise longitudinally extending expandable tubing which can be pressurized to firmly clamp the filter belt edges against a rigid reaction surface.

1 Claim, 2 Drawing Figures

FILTRATION APPARATUS

BACKGROUND OF THE INVENTION

The present invention is an improvement in the type of filtration system disclosed in U.S. Pat. No. 4,242,205. The traveling belt type of filter therein disclosed has been used for filtration of liquid such as coolants utilized in machining operations. The filter media may be of the permanent type, comprising a mesh polymeric monofilament material, which is cleaned at the point of dirt discharge by air blow-off and/or washer headers. Alternatively, the media may be expendable cellulosic and/or polymeric material.

In the intermittent traveling belt type of filter, commonly used for coolant filtration, the build-up of sludge forms a filter cake which itself acts as a fine filter to capture contaminants as the liquid penetrates the depth of the filter cake. The accumulation of this filter cake produces an increase in resistance to liquid flow through the filter cake and media, resulting in a pressure differential which can be sensed and utilized to automatically interrupt the filtration process to permit the media to be indexed to bring clean media into registry with the openings in the submerged filter box.

In this type of construction, the effectiveness of the seal between the longitudinal edge of the filter media and the surface of the filter box is an important contributing factor to the efficiency of filtration. The increased resistance to flow through the filter cake and media resulting from the accumulation of contaminants increases the likelihood of contaminated liquid by-passing the edges of the filter media through any available leakage paths.

The prevention of leakage along the longitudinal edges of the filter belt has been a problem confronting the workers in the filtration art. Fabric filter belts are subjected to alternating exposure to liquid and air, causing shrinkage, which problem has been generally compensated for by utilizing an initially over-sized belt. Fabric belts are also subject to wrinkling. The low specific weight of these fabrics requires means for forcibly holding the fabric edges against the periphery of the filter box, to prevent the undesired by-pass leakage. The transverse angle flights which span the filter belt between the driving chains to assist in conveying away accumulated sludge are generally spaced at about two foot intervals, and therefore do not provide effective sealing pressure along the longitudinal edges of the belts. Stationary seals, relying upon engagement with the intermittently moving belt, are subject to wear and may tear the fabric belt. Resilient seals traveling with the belt are impractical because such seals would have to traverse the same drive sprockets or drums which the filter belt loops traverses.

The above-referred to U.S. Pat. No. 4,242,205 discloses a supplementary chain located laterally adjacent the inside edge of the driving chain and moving therewith, which chain functions solely to hold down, by gravity, the filter belt edges against the filter box. Where an additional opening is provided in the lower surface of the box to increase the effective filtration area, gravity is not available to provide sealing pressure to hold the chain against the lower reach of the belt and the filter box. Therefore, it is necessary to utilize a supplementary system of compression springs and tracks to engage the lower reach of the chain and bias it upwardly against the lower reach of the filter belt loop.

It is the principal object of the present invention to provide an improved sealing system to prevent leakage of contaminated liquid around the longitudinal edges of a filter belt, and particularly, a system which also lends itself to effectively seaing the lower reach of the filter belt against the bottom face of the filter box.

SUMMARY OF THE INVENTION

A pressurized resilient expandable tube functions to selectively clamp the longitudinal edges of the filter belt against a rigid reaction surface. The tubing, which can be pressurized with liquid or air, is depressurized to release the clamping pressure during indexing of the filter belt.

DETAILED DESCRIPTION OF THE INVENTION

Figure 1:
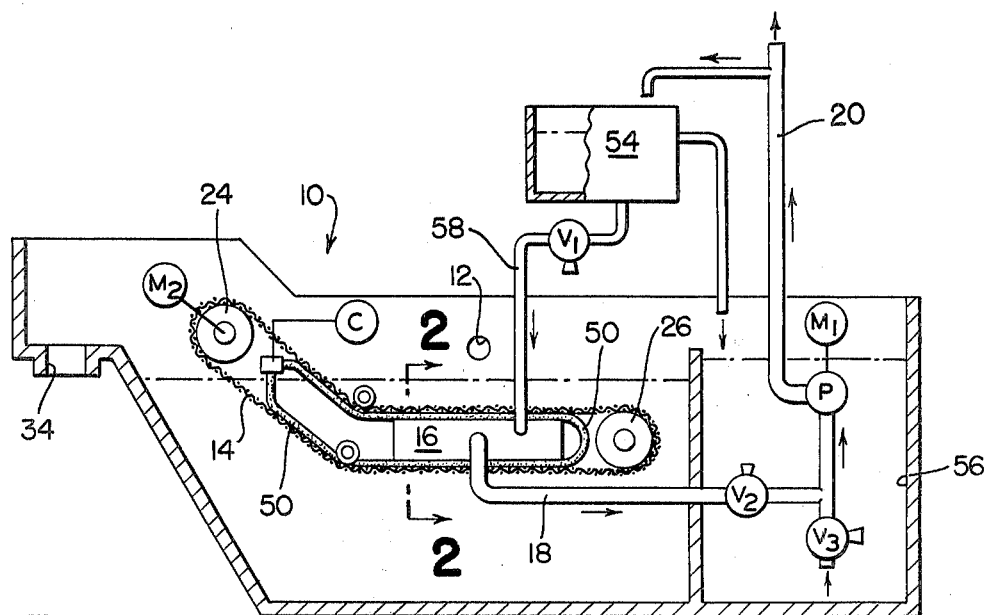
FIG. 1 is a simplified side elevation, partly in section, of a filtration system utilizing the improved sealing means of the present invention.

Referring to the simplified view of FIG. 1, the filtration system of the present invention generally comprises a tank 10 which receives contaminated liquid from an inlet 12. An endless loop filter belt 14 of fabric material circumscribes submerged filter box 16 which is provided with a perforated inlet plate in its upper surface and, optionally, in its lower surface as well. The suction side of pump P, driven by motor M1, establishes a reduced pressure within the interior of filter box 16 by a connection through outlet pipe 18. This differential pressure causes contaminated liquid to flow through filter belt 14 into the interior of box 16, and the resulting filtrate is carried from box 16 through outlet pipe 18, pump P and return pipe 20.

Filter belt 14 is power driven by means of a pair of laterally spaced driving chains 22 driven by motor M2, appropriate speed reducers (not illustrated) and head sprocket 24. Driving chains 22 circumscribe a path defined by tail sprockets 26 and appropriately located idlers.

Figure 2:
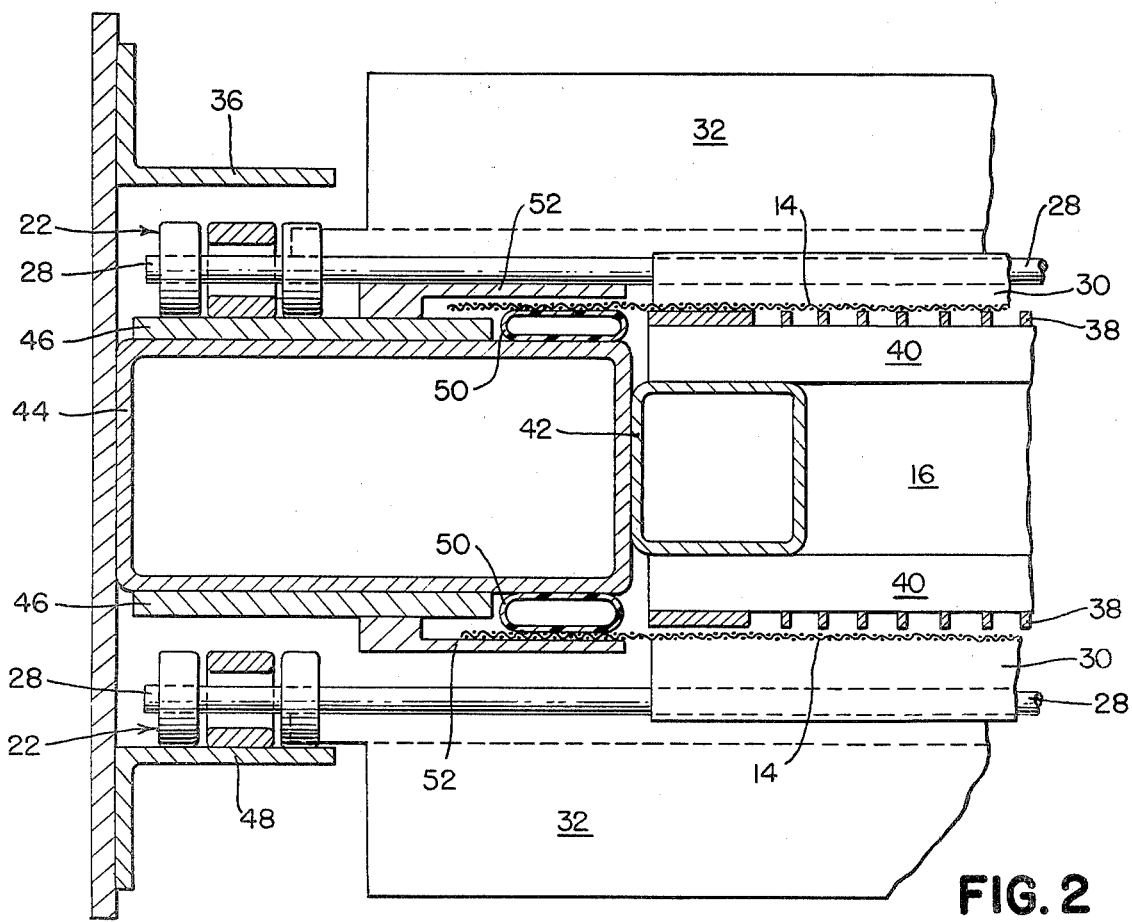
FIG. 2 is an enlarged cross-sectional view in the direction of arrows 2—2 of FIG. 1.

As can be seen from FIG. 2, driving chains 22 are spaced laterally outwardly from the longitudinal edges of filter belt 14 to avoid interference between sprockets 24, 26 and the belt. Flight bars 28 extend transversely between the pair of driving chains 22 at approximately two foot intervals, these bars slipping into the link openings of the chain. Filter belt 14 may be provided with sleeves or loops 30 which receive flight bars 28 and provide a means for driving the belt loop from chains 22. These sleeves or loops may be in the form of polypropylene tape sewn to the media.

Angle bars 32 may be fastened by screws to the intermediate portion of flight bars 28. Angles 32 aid in holding the filter belt against the surface of the filter box and also aid in conveying accumulated sludge up the inclined portion of the filter belt loop for its discharge from the tank. Sludge which fails to fall from the filter belt by gravity as the belt goes over head sprocket 24 may be blown or washed off by air or water pressure provided from nozzles (not illustrated) located within the loop and blowing outwardly through the loop near head sprocket 24. Sludge which is removed from filter belt 14 accumulates on the bottom of tank 10 and can be removed by a conventional drag-out device (unillustrated) in the form of a pair of laterally spaced power driven chains with interconnecting angle flights which scrape the settled sludge along the bottom of the tank and up the inclined ramp to exit port 34.

As shown in FIG. 2, an angle bar 36 is provided immediately above driving chain 22 to protect the chain from chips or other solid contaminant material.

The upper and lower surfaces of filter box 16 are provided with perforated metal plates 38 which define the openings in the filter box. Alternatively, a wire mesh may provide the required openings. Perforated plate 38 may in turn be supported by a grating or grid-like structure 40 which is in turn secured to the primary structural members 42, 44 which define the side walls of box 16.

Wear rails 46 support and resist wear from chains 22. These rails may be fabricated of steel or a low friction polymer plastic having high wear resistance, such as "Hi-D" manufactured by Arguto, Inc. of Aston, Pa. Lower angle iron 48 prevents the lower reach of chain 22 and its associated flight bars 28 from sagging by gravity out of position adjacent the lower opening of filter box 16.

The improved sealing means of the present invention comprises expandable sealing tubes 50, which may be fabricated of polyethylene or Teflon or the like. As shown in FIGS. 1 and 2, the tubing may be arranged in a loop surrounding the filter box 16, the tubing ends terminating at a pipe connection which leads to a compressor C or pump which establishes the necessary hydraulic or pneumatic pressure for selectively expanding the tube.

As shown in FIG. 2, tube 50 is located between structural tubing 44 and the inner face of the longitudinal edges of filter belt 14. Reaction plates 52 are fastened by screws or the like to wear rails 46 and structural members 44. The tubing is resiliently yieldable and preferably dimensioned so that in its normal circular cross-sectional shape it has a diameter greater than the vertical gap between structural member 44 and reaction plate 52. Therefore, upon installation into this gap, the tubing is somewhat flattened or deformed. Preferably, the dimensions and resilience of the tubing are selected so that, in the unexpanded or unpressurized condition of the tubing, belt 14 can freely slide between tubing 50 and reaction plates 52 during the intermittent indexing of the belt. However, upon pressurization or expansion of the tubes 50 by compressor C, a firm clamping pressure is achieved to prevent any leakage path for contaminated liquid around the edges of belt 14 and into the interior of filter box 16.

The operation of the filter system, which is conventional except for the novel sealing means described above, will now be described. During filtration, filter belt 14 is stationary, valves V1 and V3 are closed and valve V2 is open. Motor M1 drives pump P, producing a reduced pressure within filter box 16. The resulting pressure differential causes contaminated liquid to flow through filter belt 14 into the interior of filter box 16. The resulting filtrate flows from filter box 16 through outlet pipe 18 and pump P to return pipe 20, which carries it back to its source. A portion of this filtrate is directed from return pipe 20 to vacuum break tank 54, from which any overflow fills a clean liquid tank 56.

As filtering progresses, sludge accumulates on the surface of filter belt 14, which sludge establishes a filter cake to aid in the filtration of fine contaminant particles. This filter cake eventually accumulates to a depth and density which excessively restricts liquid flow. Appropriate pressure sensors in outlet pipe 18 detect the excessive pressure drop through the filter belt. An appropriate control circuit (such as disclosed in prior art U.S. Pat. No. 4,242,205) closes valve V2 and opens valves V1 and V3. Valve V3 permits clean liquid to be drawn through pump P to maintain an uninterrupted flow of filtered liquid through return pipe 20. Valve V1 permits clean liquid to flow directly into filter box 16 from tank 54 to break the vacuum which existed there, thereby eliminating the substantial pressure drop across the filter belt which could otherwise interfere with the indexing of the filter belt.

When sufficient time has been provided to eliminate this pressure differential, the pressure which was applied to sealing tube 50 during the filtration portion of the cycle must be exhausted through appropriate relief valves so that edges of filter belt 14 are released and free to index. When these steps have been completed, motor M2 is activated to drive chains 22, causing filter belt 14 to index a predetermined amount to bring clean filter media into registry with the openings in filter box 16. When this step has been completed, the control circuit then re-pressurizes the interior of sealing tubes 50 to re-establish the seal around the edges of filter belt 14. Valves V1 and V3 are then closed and valve V2 opened to re-establish the flow of contaminated liquid through the filter belt and into the filter box.

To simplify the system, tanks 54 and 56 can be combined and valve V3 eliminated. In such embodiment, clean liquid from tank 54 will serve not only to break the vacuum in filter box 16 but will also be of adequate flow rate to supply line 20 via line 18 during the filter belt indexing cycle.

The improved sealing means described above is advantageous in several ways. It eliminates the need for supplementary mechanisms such as chains, spring loaded tracks and so forth. The sealing pressure is readily adjustable by appropriate selection of the tubing material and dimensions and the applied expansion pressure. It is particularly suitable for low flow rate systems where the relatively small dynamic force of the flowing liquid through the media provides insufficient pressure to hold the media against the edges of the filter box.

This novel sealing system lends itself to sealing against the under surface of the filter box just as easily against the upper surface, permitting the effective area of filtration to be doubled for a given amount of floor space. Furthermore, the tubing can be routed around the ends of the filter box, permitting even the box ends to be utilized for filtration area.

Either hydraulic or pneumatic pressure can be used for expanding the sealing tubes. Because the use of air might tend to cause some flotation of the tube, a hydraulic pressurizing system may be preferred.

The expandable seals may also be incorporated into a design in which the filter box forms an integral part of a tank to form a self-contained unit which eliminates the need for drag tank 10.

This invention may be further developed within the scope of the following claims. Accordingly, the above specification is to be interpreted as illustrative of only a single operative embodiment of the present invention, rather than in a strictly limited sense.

I now claim:

1. In a filtering apparatus of the type wherein contaminated liquid is supplied to a tank and caused by differential pressure to flow through a submerged perforate filter means into the inlet in the top wall of a submerged filter box, filter means including an endless loop perforate filter belt which circumscribes the filter box, means for removing filtrate liquid from the filter box, a power driven conveyor comprising transverse flight bars spanning the filter belt above the upper reach of the filter belt and connected thereto at points intermediate the longitudinal edges of the belt to selectively advance the normally stationary filter means in response to a build-up of dirt thereon to bring clean filter means into registry with the filter box inlet, the improved means for preventing leakage of unfiltered liquid around the longitudinal edges of the filter belt and into the filter box which comprises:

the longitudinally extending edges of the filter belt projecting laterally outwardly beyond the lateral edges of the filter box inlet and into a space between upper and lower continuous longitudinally extending substantially rigid members, said upper rigid member being located above said filter belt edge and beneath the flight bars;

belt sealing means comprising tubing which is resiliently collapsible in cross-section, such tubing extending longitudinally along and in abutting contact with each of said longitudinally extending edges of the upper reach of said filter belt and being normally compressed between the lower surface of said upper belt reach and said lower rigid member;

pressurizing means for selectively pressurizing the interior of the tubing thereby tending to expand said tubing to increase the compression force against said belt edges to establish a tight seal between said belt edges and said lower rigid members and to press said belt edges upward against said upper rigid members, thereby to prevent leakage around said longitudinal edges and into the filter box, said upper rigid members serving as reaction members for the compression force created by said pressurized tubing.

* * * * *